United States Patent
Zheng et al.

(10) Patent No.: US 11,600,301 B2
(45) Date of Patent: Mar. 7, 2023

(54) METHOD AND DEVICE OF EDITING A VIDEO

(71) Applicant: Shanghai Bilibili Technology Co., Ltd., Shanghai (CN)

(72) Inventors: Long Zheng, Shanghai (CN); Ran Tang, Shanghai (CN); Siqi Yin, Shanghai (CN); Shangxin Yang, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/319,697

(22) Filed: May 13, 2021

(65) Prior Publication Data
US 2021/0358524 A1    Nov. 18, 2021

(30) Foreign Application Priority Data
May 14, 2020   (CN) .......................... 202010409251.0

(51) Int. Cl.
G11B 27/036    (2006.01)
G11B 27/34    (2006.01)
G11B 27/10    (2006.01)

(52) U.S. Cl.
CPC .......... *G11B 27/036* (2013.01); *G11B 27/102* (2013.01); *G11B 27/34* (2013.01)

(58) Field of Classification Search
USPC ................................................. 386/248, 278
See application file for complete search history.

(56) References Cited

U.S. PATENT DOCUMENTS

| | | | |
|---|---|---|---|
| 7,913,164 B1* | 3/2011 | Svendsen ........... | H04N 1/00244 715/249 |
| 8,165,424 B1* | 4/2012 | Lovejoy ................. | H04N 19/00 348/69 |
| 8,464,304 B2* | 6/2013 | Harwell ............. | H04N 21/2343 725/115 |
| 9,110,572 B2* | 8/2015 | Gerhardt ............... | G06F 3/0484 |
| 9,583,140 B1* | 2/2017 | Rady ................ | H04N 21/44004 |

(Continued)

FOREIGN PATENT DOCUMENTS

| CN | 103123718 A | 5/2013 |
|---|---|---|
| CN | 104091607 A | 10/2014 |

(Continued)

*Primary Examiner* — Nigar Chowdhury
(74) *Attorney, Agent, or Firm* — BakerHostetler (57) ABSTRACT

The present disclosure describes techniques of editing a video. The techniques described in the present disclosure comprise converting a to-be-edited video comprising a plurality of frames into an image sequence comprising a plurality of images, wherein a resolution of each image in the image sequence is lower than a resolution of a corresponding frame in the to-be-edited video; generating a script of editing the to-be-edited video based at least in part on selecting and editing at least some of the plurality of images in the image sequence; displaying a preview of editing effects based on the script; and sending the script to a server computing device in response to determining the preview satisfies requirements, wherein the to-be-edited video is processed by the server computing device based on the script of editing the to-be edited video.

14 Claims, 6 Drawing Sheets

(56) References Cited

U.S. PATENT DOCUMENTS

| | | | |
|---|---|---|---|
| 10,424,102 B2* | 9/2019 | McKaskle | G11B 27/34 |
| 10,891,426 B2* | 1/2021 | Ohtake | G06F 40/106 |
| 2007/0234214 A1* | 10/2007 | Lovejoy | G11B 27/034 |
| | | | 715/730 |
| 2008/0037826 A1* | 2/2008 | Sundstrom | G06F 16/51 |
| | | | 386/E5.072 |
| 2010/0260468 A1* | 10/2010 | Khatib | H04N 21/2662 |
| | | | 386/282 |
| 2010/0262710 A1* | 10/2010 | Khatib | G11B 27/034 |
| | | | 715/723 |
| 2011/0030031 A1* | 2/2011 | Lussier | G06F 3/0481 |
| | | | 709/219 |
| 2011/0194839 A1* | 8/2011 | Gebert | G11B 27/034 |
| | | | 386/E5.028 |
| 2013/0266290 A1* | 10/2013 | Sathish | G11B 27/031 |
| | | | 386/E5.028 |
| 2014/0099081 A1* | 4/2014 | Cudak | H04N 21/4667 |
| | | | 386/278 |
| 2014/0161354 A1* | 6/2014 | Curcio | G06K 9/629 |
| | | | 382/190 |
| 2015/0130814 A1* | 5/2015 | Taraki | G06T 11/60 |
| | | | 345/441 |
| 2016/0014482 A1* | 1/2016 | Chen | H04N 21/23418 |
| | | | 386/241 |
| 2017/0127127 A1* | 5/2017 | Zavesky | G06V 20/46 |
| 2017/0206013 A1* | 7/2017 | Nie | G06F 3/0608 |
| 2017/0303001 A1* | 10/2017 | Montoya | G11B 27/34 |
| 2017/0324996 A1* | 11/2017 | Thaker | H04N 21/4662 |
| 2018/0330756 A1 | 11/2018 | MacDonald | |
| 2019/0200079 A1* | 6/2019 | Mathur | H04N 21/4402 |
| 2020/0151331 A1* | 5/2020 | Watanabe | H04L 9/3236 |
| 2020/0151917 A1* | 5/2020 | Watanabe | G11B 27/32 |
| 2021/0306476 A1* | 9/2021 | Inoue | H04N 1/00214 |

FOREIGN PATENT DOCUMENTS

| | | |
|---|---|---|
| CN | 104796767 A | 7/2015 |
| CN | 109121009 A | 1/2019 |
| CN | 109495790 A | 3/2019 |
| CN | 109862410 A | 6/2019 |
| CN | 109963168 A | 7/2019 |

* cited by examiner

METHOD AND DEVICE OF EDITING A VIDEO

CROSS-REFERENCE TO RELATED APPLICATION

The present application claims priority to Chinese Patent Application No. 202010409251.0, filed on May 14, 2020, entitled "Method and device of editing a video". Entire content of the Chinese patent application is incorporated in the present application by reference.

BACKGROUND

At present, various terminal devices are equipped with video editors. A user can use a video editor to edit a video. An editing interface of the video editor is provided editing function item of different editing types, such as adding a filter, adding a special effect or adding a text. The user performs a corresponding video editing effect by searching for a required editing function item in the editing function item.

SUMMARY

One purpose of the present application is to provide a method and device of editing a video, which solves the problems of the large volume occupied by a video editor, complex operations, and high performance requirements for the operation terminal in the prior art.

According to one aspect of the application, a method of editing a video is provided, the method including converting a to-be-edited video comprising a plurality of frames into an image sequence comprising a plurality of images, wherein a resolution of each image in the image sequence is less than a resolution of a corresponding frame in the to-be-edited video; generating a script of editing the to-be-edited video based at least in part on selecting and editing at least some of the plurality of images in the image sequence; displaying a preview of editing effects using the script; and sending the script to a server computing device, wherein the to-be-edited video is processed by the server computing device based on the script of editing the to-be edited video.

According to another aspect of the application, a system of editing a video is further provided, the system including at least one processor; and at least one memory communicatively coupled to the at least one processor and storing instructions that upon execution by the at least one processor cause the system to perform the method as described above.

According to another aspect of the application, a computer-readable medium is further provided, which stores computer-readable instructions that can be executed by a processor to implement the method as described above.

BRIEF DESCRIPTION OF THE DRAWINGS

By reading the detailed description of the non-limiting embodiments with reference to the following drawings, other features, purposes and advantages of the present application will become more apparent.

The same or similar reference signs in the drawings represent the same or similar parts.

DETAILED DESCRIPTION OF ILLUSTRATIVE EMBODIMENTS

The present application will be further described in detail below in conjunction with the drawings.

In a typical configuration of the present application, a terminal, a device serving a network and a trusted party all include one or more processors (for example, a Central Processing Unit (CPU)), an input/output interface, a network interface, and a memory.

The memory may include non-permanent memory in a computer-readable storage medium, a Random Access Memory (RAM) and/or non-volatile memory, such as a Read Only Memory (ROM) or a flash RAM. The memory is an example of the computer-readable storage medium.

The computer-readable storage medium includes permanent and non-permanent, removable and non-removable media, and information storage can be realized by any method or technology. The information can be computer-readable instructions, data structures, program modules, or other data. Examples of computer storage medium include, but are not limited to, a Phase-Change RAM (PRAM), a Static Random Access Memory (SRAM), and a Dynamic Random Access Memory (DRAM), other types of Random Access Memory (RAM), a Read-Only Memory (ROM), an Electrically Erasable Programmable Read-Only Memory (EEPROM), flash memory or other memory technology, Compact Disc Read-Only Memory (CD-ROM), Digital Versatile Disk (DVD) or other optical storage, a magnetic cassette, a magnetic tape disk storage or other magnetic storage device or any other non-transmission medium that can be used to store information which can be accessed by computing devices. According to the definition in this article, the computer-readable storage medium does not include non-transitory media, such as modulated data signals and carrier waves.

The existing video editor occupies a large volume and is complicated to operate, and when loading a high-resolution video for editing, the memory required for editing is too large, which causes the operation terminal to freeze and requires high performances for the operation terminal.

Compared with the prior art, the present disclosure provides unexpected effects. The preview effect and the actual modification effect corresponding one to one is achieved, which is easy to operate. Furthermore, by first editing low-resolution and low-definition video images, a set of scripts of editing a to-be-edited video are generated, the scripts are previewed, and the scripts are uploaded to the server, so that the server computing device processes the to-be-edited video with high-resolution based on the script, which can reduce the requirements of the web on the machine performance, reduce freeze, and improve the user's experience.

Figure 1:
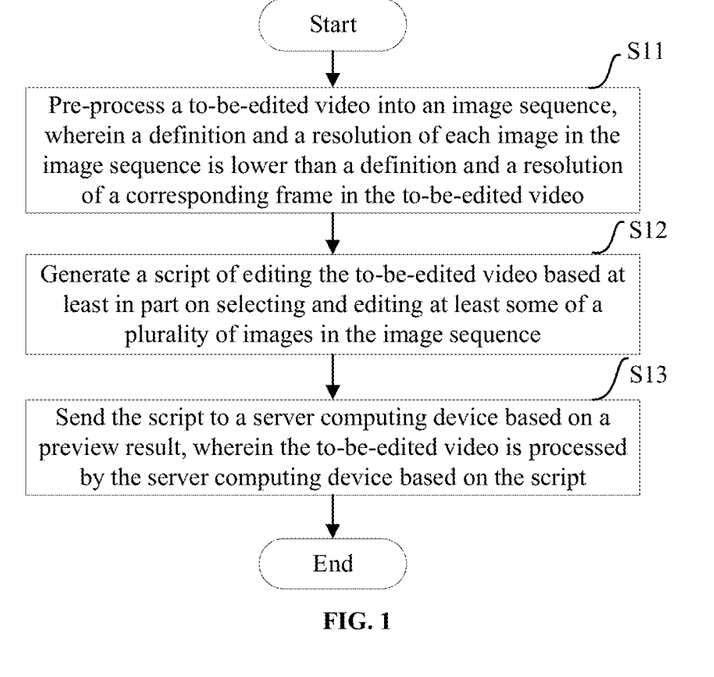
FIG. 1 shows a schematic flowchart of a method of editing a video according to one aspect of the present application.

FIG. 1 shows a schematic flowchart of a method of editing a video according to one aspect of the present application, and the method includes steps S11 to S13:

In the step S11, a to-be-edited video is pre-processed into an image sequence, wherein a definition and a resolution of an image in the image sequence are both lower than a definition and a resolution of the to-be-edited video. Herein, the to-be-edited video can be obtained from a local audio file or from a network, and obtaining the to-be-edited video from the network can be achieved by setting a dedicated interface for a video website. The to-be-edited video is preferably a high-resolution and high-definition video, and the to-be-edited video is preprocessed into a low-resolution and low-definition video, such as converting a 1080P video to a 480P video, so that the image corresponding to each frame is output to form the image sequence, and then the image sequence is dragged to an interface where an editing track is located for previewing, thereby avoiding an operation freeze problem caused by directly editing the high-definition video.

In the step S12, a script to be used for editing the to-be-edited video by a server computing device is generated based at least in part on selecting and editing at least some images in the image sequence. Herein, the user instruction is a target demand instruction, which is used to complete the instruction for the user to edit the image to generate a required video, and may include a mouse input instruction or a shortcut key instruction, that is, a corresponding instruction is determined by mouse input or usage of the shortcut key. The image in the image sequence displayed on the interface where the editing track is located is selected according to the user instruction, and the image is dragged to an editing track. When all the images are dragged as required, the existing images on the editing track can be spliced, or be processed, such as adding material for display effects or modifying a font, a size or contents, and so on, and then the editing script is generated.

In the step S13, the editing script is sent to the server computing device according to a preview result of the editing script, wherein the server computing device processes the to-be-edited video based on the editing script. Herein, the generated editing script is previewed so as to send the editing script to the server according to the preview effect. If the preview effect meets the demand of a user, the editing script is uploaded, so that the server performs complete processing on the to-be-edited video in step S11 according to the editing script, that is, the low-definition and low-resolution image is used to edit first, the editing script is generated, and then previewed according to the editing script. Since the video is of low definition, therefore the network demand will not be too great, and the generated editing script is only the preview effect, and no real video file is generated. When the preview effect meets the demand, the original high-definition video can be processed according to the editing script to generate an edited video.

In an embodiment of the present application, the editing track includes at least one track containing a time axis dimension, and a cursor is used to specify a time axis position of the time axis dimension. Herein, the editing track includes a plurality of tracks, the track has the time axis dimension, and each editing track uses a cursor to specify the time axis position of the time axis dimension. Exemplarily, in a specific practical scene application, as shown in a software interface shown in FIG. 2, L1, L2, and L3 represent three editing tracks, T is the time axis dimension, and C represents the cursor, which is used to specify the time axis position of the time axis dimension.

Figure 3:
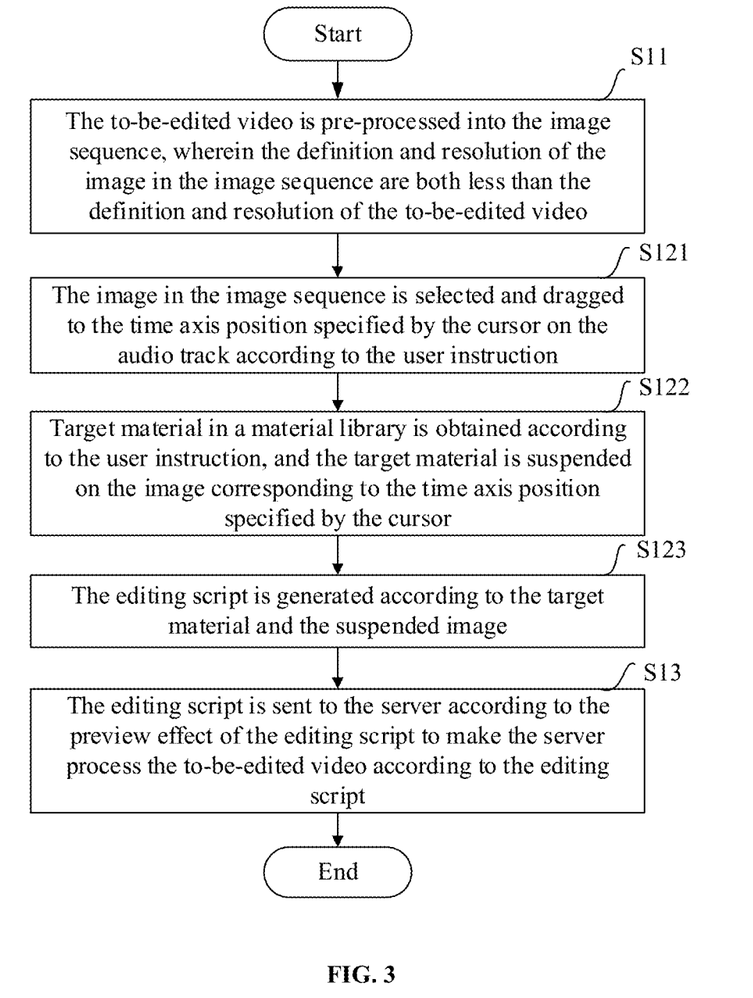
FIG. 3 shows a schematic flowchart of a method of editing a video in an embodiment of the present application.

Continuing with the above embodiment, as shown in FIG. 3, step S11, the to-be-edited video is pre-processed into the image sequence, wherein the definition and resolution of the image in the image sequence are both less than the definition and resolution of the to-be-edited video; step S121, at least some images in the image sequence are selected and edited based on the time axis positions specified by the cursor on the editing track according to user input. Herein, any selected image is dragged to the time axis position specified by the cursor on the editing track by dragging, and the image can be cut according to the time axis position and a size of image. Wherein, the existing image on the editing track or an audio and a video generated based on the existing image can be cut, copied and dragged. Any segment of the cut video contains a complete data of the video before cutting before saving a modified video file, that is, one complete video is copied first, and then a cutting effect is displayed. Each video segment after cutting can be stretched into a complete video before cutting, and the video after saving is defined by a bounding box outside the video segment to achieve a WYSIWYG (which means what you see is what you get) effect, wherein the bounding box is determined according to a size of the video and a position specified by the cursor. A cutting position is determined according to a time point specified by the cursor. What is being dragged during a drag process is data, no matter what a size of an original video during dragging is, a blank part of the time axis remaining of a target drag position can be determined according to the position specified by the cursor.

Figure 4:
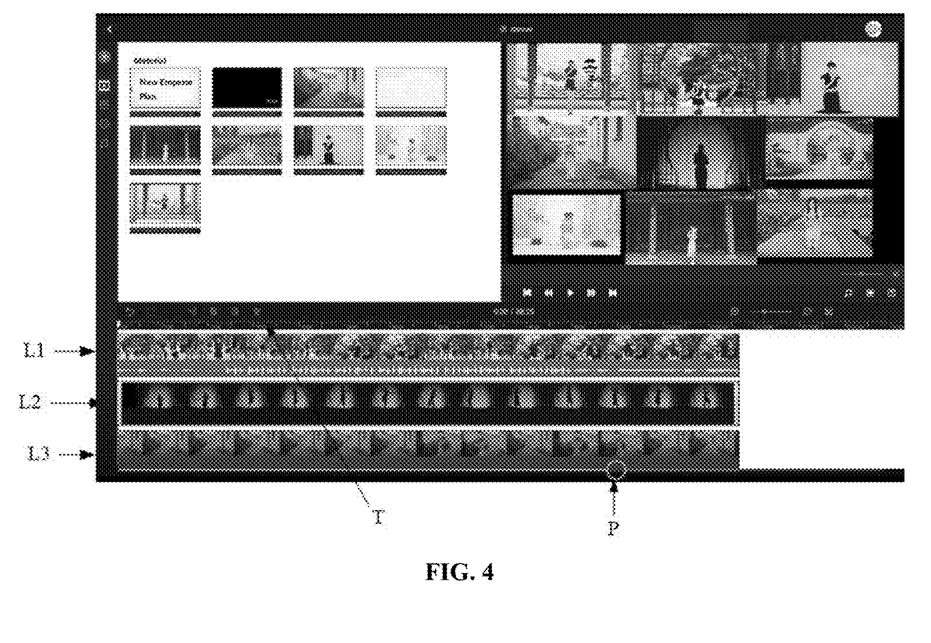
FIG. 4 shows a schematic diagram of a preview after editing in a preview interface in a specific application scenario of the present application.
Figure 5:
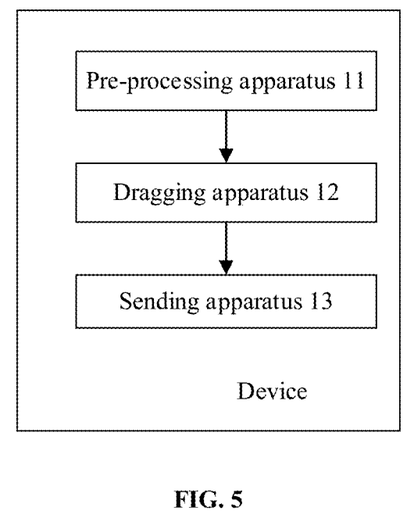
FIG. 5 shows a schematic structural diagram of a device of editing a video according to another aspect of the present application.

Continue to refer to FIG. 3, step S122, target material in a material library is obtained according to the user instruction, and the target material is associated with corresponding images based on corresponding time axis positions specified by the cursor; step S123, the editing script is generated according to the target material and the corresponding images. Thereby, step S13, the editing script is sent to the server computing device based on determining that a preview of editing effects using the script satisfies requirements, wherein the to-be-edited video is processed by the server computing device based on the script of editing the to-be edited video. Herein, during the operation, the target material is obtained from a local material library or a network material library. The target material includes textures, texts, Mosaic effects and so on. The target material can be displayed on the interface where the editing track is located, after pushing a selected image to the editing track according to the user instruction, target material corresponding to the image can be selected and dragged into the editing track, which can be suspended on the video corresponding to the time axis where the image is located. Thereby, the editing script is generated based on existing target material and image on the editing track. Exemplarily, as shown in FIG. 4, in the software interface, L1 and L2 represent editing tracks, T is the time axis dimension, and P represents a preview progress of the editing script generated after the image and material are edited on the editing track, processing of various materials on the low-resolution video in the software interface through the user instruction can refer to processing on L1 and L2. When playing the low-resolution video, an edited video effect can be intuitively watched, avoiding the problem of machine freeze caused by excessive memory when directly loading high-resolution videos for editing.

Wherein, when dragging images, fonts and other materials to the editing track, the size, font, and contents of the material can be further modified on the basis of a determined time axis, such as a line of words in font format of SimSun are dragged to the editing track and suspended on the image corresponding to the time axis, the font of the line of words can be further modified to a font format of clerical script.

In an embodiment of the present application, a processing operation on the image on the editing track may be correspondingly completed according to the user instruction, wherein the processing operation includes a rollback operation and an undo restore operation. Herein, during the operation of the interface where the editing track is located, shortcut keys can be supported, so that the rollback operation and the undo restore operation can be completed by receiving the shortcut key instruction or the mouse input instruction; the time axis on the editing track can also be zoomed.

In an embodiment of the present application, in the step S13, the editing script is played to obtain the preview effect, and a storage instruction of a user is determined according to the preview effect; and the editing script is processed into a plurality of character strings according to the storage instruction of the user and the plurality of the character strings are uploaded to the server. Herein, the editing script is played for preview, whether it needs to be stored is determined according to the preview effect, all the results of the above-mentioned video processing and material processing are output to be the plurality of the character strings according to the user's storage instruction, and the plurality of the character strings are uploaded to the server as a script. For example, an image A requires to be added in the fifth to tenth seconds on a first editing track, then the image A is processed, such as adding material filters, adding texts and so on; a line of words are added in the second to fifth seconds on a second editing track, and the font is font B; then the script is determined according to the image used on the first editing track and the material processing result during image processing, and the image used on the second editing track and material processing result during image processing, and the script is uploaded to the server in the form of the plurality of the character strings, so that the server edits the high-definition original video according to the script.

In an embodiment of the present application, the method includes: dividing the editing track into a preview window layer, a video layer and an audio layer, wherein the preview window layer and the video layer are rendered synchronously, and the audio layer is used to add an audio effect according to the user instruction. Herein, the interface where the editing track is located includes a preview interface, the preview interface includes three layers, that is, the preview interface where the editing track is located includes three layers, the first layer is the preview window, the second layer is the video layer, and the third layer is the audio layer, wherein, the first layer and the second layer are implemented by Canvas, and the first layer and the second layer are rendered synchronously, and the WYSIWYG effect is achieved through real-time editing and rendering from the upper layer to the lower layer. The audio effect can be added on the editing track of the third layer, such as audio filters and so on. The addition of the effect can be implemented according to the shortcut key instruction or the mouse input instruction.

Following the above embodiment, a moved image on the first editing track can be determined according to the user instruction, and the moved image can be dragged onto the second editing track; an image to be dragged to the first editing track is reselected from the image sequence according to the time axis of the first editing track where the moved image is located. Herein, by dividing the preview interface into three layers, multi-track cross-track data transfer can be realized. The data on the first editing track is dragged to the second editing track, and the contents on a plurality of tracks can be cross-tracked operated, wherein, the first editing track and the second editing track are only to illustrate that there are a plurality of editing tracks and are not specifically referred to. The first editing track and the second editing track may be interchangeable, for example, track A is the first editing track and track B is the second editing track, and track C can also be used as the second editing track; or track B can be the first editing track and track A can be the second editing track. When dragging the image or material to the editing track, the image or image and the corresponding material on the first editing track may be dragged to the second editing track to leave the time axis of the first editing track to place the edited video.

Through the method of editing a video in the above embodiments, it is possible to efficiently process and edit local or network audio and video in the same interface (such as a web page), realize editing and modifying audio and video internal add materials, support a variety of shortcut keys, and achieve the preview effect and the actual modification effect corresponds one to one, which is easy to operate. At the same time, by editing a low-definition video image first, a set of scripts of video processing are generated, the low-definition scripts are previewed, and the scripts are uploaded to the server if meets an expected needs of the editor, so that the server processes the high-definition video according to the script of the low-definition version, which can reduce the requirements of the web on the machine performance, reduce freeze, and improve the user's experience.

In addition, in the embodiment of the present application, a computer-readable medium is provided, which stores computer-readable instructions that can be executed by a processor to implement the aforementioned method of editing a video.

Figure 2:
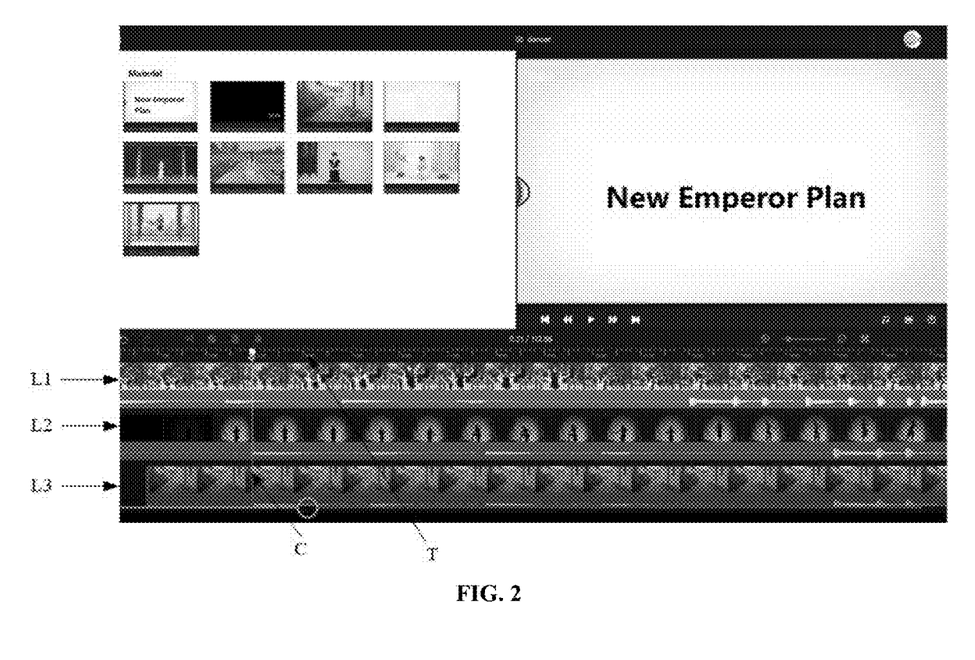
FIG. 2 shows a schematic diagram of an editing track in a preview interface in a specific application scenario of the present application.

Corresponding to the method described above, the present application also provides a terminal device, which includes modules or units capable of executing the method steps described in FIG. 1 or FIG. 2 or FIG. 3 or each embodiment. These modules or units can be implemented through hardware, software or a combination of software and hardware, the present application is not limited. For example, in an embodiment of the present application, a device of editing a video is also provided, and the device includes:

one or more processors; and a memory storing computer-readable instructions, when the computer-readable instructions are executed, to cause the processors to perform the operations of the aforementioned method.

For example, the computer-readable instructions, when executed, to cause the one or more processors:

pre-processing a to-be-edited video into an image sequence, wherein a definition and a resolution of an image in the image sequence are less than a definition and a resolution of the to-be-edited video;

selecting and dragging the image in the image sequence to an editing track according to a user instruction to generate an editing script;

sending the editing script to a server according to a preview effect of the editing script to make the server process the to-be-edited video according to the editing script.

FIG. 4 shows a structural diagram of a device of editing a video according to another aspect of the present application, the device includes: a pre-processing apparatus 11, a dragging apparatus 12 and a sending apparatus 13, wherein the pre-processing apparatus 11 is for pre-processing a to-be-edited video into an image sequence, wherein a definition and resolution of an image in the image sequence are both less than a definition and a resolution of the to-be-edited video; the dragging apparatus 12 is for selecting and dragging the image in the image sequence to an editing track according to a user instruction to generate an editing script; the sending apparatus 13 is for sending the editing script to a server according to a preview effect of the editing script to make the server process the to-be-edited video according to the editing script.

It should be noted that the contents executed by the pre-processing apparatus 11, the dragging apparatus 12 and the sending apparatus 13 are the same as or corresponding to the contents in the above steps S11, S12, and S13 respectively. For the sake of brevity, it will not be repeated here.

Obviously, those skilled in the art can make various changes and modifications for the present application without departing from the spirit and scope of the present application. In this way, if these modifications and variations of the present application fall within the scope of the claims of the present application and their equivalent technologies, then the present application is also intended to include these modifications and variations.

It should be noted that the present application can be implemented in software and/or a combination of software and hardware. For example, it can be implemented using an Application Specific Integrated Circuit (ASIC), a general purpose computer or any other similar hardware device. In an embodiment, the software program of the present application may be executed by a processor to realize the steps or functions described above. Similarly, the software program (including related data structure) of the present application can be stored in computer-readable recording medium, such as RAM memory, magnetic or optical drive or floppy disk and similar devices. In addition, some steps or functions of the present application may be implemented by hardware, for example, as a circuit that cooperates with a processor to execute each step or function.

In addition, a part of the present application can be applied as a computer program product, such as a computer program instruction, when it is executed by a computer, through the operation of the computer, the method and/or technical solution according to the present application can be invoked or provided. The program instructions that invoke the method of the present application may be stored in a fixed or removable recording medium, and/or be transmitted through a data stream in a broadcast or other signal-carrying medium, and/or be stored in the working memory of the computer device which is run according to the program instructions. Herein, an embodiment according to the present application includes an apparatus, including a memory for storing computer program instructions and a processor for executing the program instructions, wherein, when the computer program instructions are executed by the processor, the apparatus is trigged to perform the aforementioned methods and/or technical solutions according to a plurality of embodiments of the present application.

Figure 6:
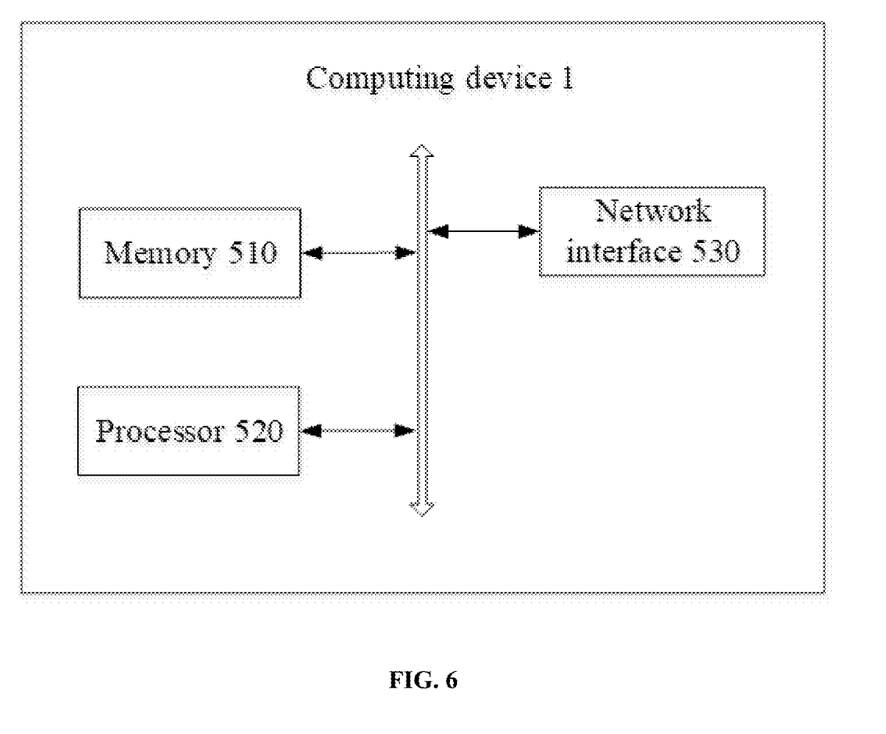
FIG. 6 is a schematic diagram of an optional hardware architecture of a computing device of the present application.

FIG. 6 schematically shows a schematic diagram of the hardware architecture of the computing device 1 suitable for implementing the method of displaying multi-screen interactive according to a third embodiment of the present application. In the embodiment, the computing device 1 is a device capable of automatically performing numerical calculations and/or information processing according to predefined or stored instructions. For example, can be a Smartphone, a tablet, a laptop, a desktop computer, a rack server, a blade server, a tower server, or a cabinet server (including stand-alone servers, or a cluster of a plurality of servers), and so on. As shown in FIG. 4, the computing device 1 includes at least, but is not limited to, a memory 510, a processor 520, and a network interface 530 that can be communicated with each other through a system bus.

The memory 510 includes at least one type of computer-readable storage medium. The readable storage medium includes a flash memory, a hard disk, a multimedia card, a card type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, etc. In some embodiments, the memory 510 may be an internal storage module of the computing device 500 such as a hard disk or a memory of the computing device 1. In other embodiments, the memory 510 may also be an external storage device of the computing device 1, such as a plugged hard disk provided on the computing device 1, a Smart Media Card (SMC), a Secure Digital (SD) card, a flash memory card, and the like. Of course, the memory 510 may also include both the internal storage module and the external storage device of the computing device 1. In the embodiment, the memory 510 is generally used to store an operating system and various types of application software installed in the computing device 1 such as program codes of method of displaying multi-screen interactive and the like. In addition, the memory 510 may also be used to temporarily store various types of data that have been or will be outputted.

The processor 520, in some embodiments, may be a Central Processing Unit (CPU), a controller, a microprocessor, or other data processing chip. The processor 520 is generally used to control the overall operation of the computing device 1, such as a client computing device and a server computing system that may be used in the present disclosure for editing videos. In the embodiment, the processor 520 is used to run program codes or process data stored in the memory 510.

The network interface 530 may include a wireless network interface or a wired network interface which is generally used to establish a communication connection between the computing device 1 and other computing devices. For example, the network interface 530 is used for connecting the computing device 1 to an external terminal via a network and establishing a data transmission channel and a communication connection between the computing device 1 and the external terminal. The network can be a wireless or wired network such as an enterprise Intranet, an Internet, a Global System of Mobile communication (GSM), a Wideband Code Division Multiple Access (WCDMA), a 4G network, a 5G network, a Bluetooth, Wi-Fi, and the like.

It is to be noted that FIG. 6 shows only a computing device 1 having components 510-530, but it should be understood that it is not required to implement all of the shown components and that more or fewer parts can be implemented in lieu thereof.

In the embodiment, the program codes of the method of displaying multi-screen interactive stored in the memory 510 also may be divided into one or more program modules and executed by one or more processors (the processor 510 in the embodiment) to implement techniques described in the present disclosure.

For those skilled in the art, it is obvious that the present application is not limited to the details of the foregoing exemplary embodiments, and the present application can be implemented in other specific forms without departing from the spirit or basic characteristics of the present application. Therefore, from any point of view, the embodiments should be regarded as exemplary and non-limiting. The scope of the present application is defined by the appended claims rather than the above description, and therefore it is intended to include all changes falling within the meaning and scope of equivalent elements of the claims in the present application. Any reference signs in the claims should not be regarded as limiting the claims involved. In addition, it is obvious that the word "including" does not exclude other units or steps, and the singular does not exclude the plural. A plurality of units or devices stated in the apparatus claims can also be implemented by one unit or apparatus through software or hardware. The first and second words are used to denote names, but do not denote any specific order.

What is claimed is:

1. A method of editing a video, comprising:
   converting a to-be-edited video comprising a plurality of frames into an image sequence comprising a plurality of images, wherein a resolution of each image in the image sequence is lower than a resolution of a corresponding frame in the to-be-edited video;
   generating a script of editing the to-be-edited video based at least in part on selecting and editing at least some of the plurality of images in the image sequence, wherein the generating a script of editing the to-be-edited video based at least in part on selecting and editing at least some of the plurality of images in the image sequence further comprises:
   selecting and editing the at least some of the plurality of images in the image sequence based on at least one editing track, wherein the at least one editing track comprises a time axis and a cursor of specifying a time point on the time axis,
   obtaining target material from a material library, wherein the at least some of the plurality of images in the image sequence are edited using the target material,
   associating the target material with corresponding images based on corresponding time points on the time axis, and
   generating the script of editing the to-be-edited video based on the target material and the at least some of the plurality of images in the image sequence;
   displaying a preview of editing effects based on the script; and
   sending the script to a server computing device in response to determining the preview satisfies requirements, wherein the to-be-edited video is processed by the server computing device based on the script of editing the to-be edited video.

2. The method of claim 1, wherein the sending the script of editing the to-be-edited video to a server computing device further comprises:
   processing the script into a plurality of character strings; and
   uploading the plurality of the character strings to the server computing device.

3. The method of claim 1, further comprising:
   performing at least one processing operation on the at least some of the plurality of images based on user input, wherein the at least one processing operation comprises a redo operation or an undo operation.

4. The method of claim 1, wherein the at least one editing track comprises a preview window layer, a video layer, and an audio layer, wherein the preview window layer and the video layer are rendered synchronously.

5. The method of claim 4, further comprising:
   adding one or more audio effects based on user input using the audio layer.

6. A system, comprising:
   at least one processor; and
   at least one memory communicatively coupled to the at least one processor and storing instructions that upon execution by the at least one processor cause the system to perform operations comprising:
   converting a to-be-edited video comprising a plurality of frames into an image sequence comprising a plurality of images, wherein a resolution of each image in the image sequence is lower than a resolution of a corresponding frame in the to-be-edited video;
   generating a script of editing the to-be-edited video based at least in part on selecting and editing at least some of the plurality of images in the image sequence, wherein the generating a script of editing the to-be-edited video based at least in part on selecting and editing at least some of the plurality of images in the image sequence further comprises:
   selecting and editing the at least some of the plurality of images in the image sequence based on at least one editing track, wherein the at least one editing track comprises a time axis and a cursor of specifying a time point on the time axis,
   obtaining target material from a material library, wherein the at least some of the plurality of images in the image sequence are edited using the target material,
   associating the target material with corresponding images based on corresponding time points on the time axis, and
   generating the script of editing the to-be-edited video based on the target material and the at least some of the plurality of images in the image sequence;
   displaying a preview of editing effects based on the script; and
   sending the script to a server computing device in response to determining the preview satisfies requirements, wherein the to-be-edited video is processed by the server computing device based on the script of editing the to-be edited video.

7. The system of claim 6, wherein the sending the script of editing the to-be-edited video to a server computing device further comprises:
   processing the script into a plurality of character strings; and
   uploading the plurality of the character strings to the server computing device.

8. The system of claim 6, the operations further comprising:
   performing at least one processing operation on the at least some of the plurality of images based on user input, wherein the at least one processing operation comprises a redo operation or an undo operation.

9. The system of claim 6, wherein the audio track comprises a preview window layer, a video layer, and an audio layer, wherein the preview window layer and the video layer are rendered synchronously.

10. The system of claim 9, the operations further comprising:
    adding one or more audio effects based on user input using the audio layer.

11. A non-transitory computer-readable storage medium, storing computer-readable instructions that upon execution by a processor cause the processor to implement operations comprising:

converting a to-be-edited video comprising a plurality of frames into an image sequence comprising a plurality of images, wherein a resolution of each image in the image sequence is lower than a resolution of a corresponding frame in the to-be-edited video;

generating a script of editing the to-be-edited video based at least in part on selecting and editing at least some of the plurality of images in the image sequence, wherein the generating a script of editing the to-be-edited video based at least in part on selecting and editing at least some of the plurality of images in the image sequence further comprises:

selecting and editing the at least some of the plurality of images in the image sequence based on at least one editing track, wherein the at least one editing track comprises a time axis and a cursor of specifying a time point on the time axis, obtaining target material from a material library, wherein the at least some of the plurality of images in the image sequence are edited using the target material, associating the target material with corresponding images based on corresponding time points on the time axis, and generating the script of editing the to-be-edited video based on the target material and the at least some of the plurality of images in the image sequence;

displaying a preview of editing effects based on the script; and sending the script to a server computing device in response to determining the preview satisfies requirements, wherein the to-be-edited video is processed by the server computing device based on the script of editing the to-be edited video.

12. The non-transitory computer-readable storage medium of claim 11, wherein the sending the script of editing the to-be-edited video to a server computing device further comprises:

processing the script into a plurality of character strings; and uploading the plurality of the character strings to the server computing device.

13. The non-transitory computer-readable storage medium of claim 11, wherein the audio track comprises a preview window layer, a video layer, and an audio layer, wherein the preview window layer and the video layer are rendered synchronously.

14. The non-transitory computer-readable storage medium of claim 13, the operations further comprising:

adding one or more audio effects based on user input using the audio layer.

* * * * *